United States Patent [19]
Salyer

[11] Patent Number: 6,079,404
[45] Date of Patent: Jun. 27, 2000

[54] ARTICLE FOR THERMAL ENERGY STORAGE

[75] Inventor: Ival O. Salyer, Dayton, Ohio

[73] Assignee: The University of Dayton, Dayton, Ohio

[21] Appl. No.: 08/929,899

[22] Filed: Sep. 15, 1997

Related U.S. Application Data

[63] Continuation of application No. 08/882,026, Jun. 25, 1997, abandoned, and a continuation of application No. 08/662,876, Jun. 12, 1996, abandoned.

[51] Int. Cl.[7] .................................................. F24J 1/00
[52] U.S. Cl. .................. 126/263.03; 126/206; 126/400; 220/545
[58] Field of Search ............................... 126/400, 263.01, 126/246, 204, 205, 206, 263.02, 263.03; 252/71, 70; 206/550, 548, 545, 546

[56] References Cited

U.S. PATENT DOCUMENTS

| | | |
|---|---|---|
| 3,784,504 | 1/1974 | Verakas . |
| 4,008,170 | 2/1977 | Allan . |
| 4,237,023 | 12/1980 | Johnson et al. . |
| 4,259,401 | 3/1981 | Chahroudi et al. . |
| 4,431,558 | 2/1984 | Wada et al. . |
| 4,830,190 | 5/1989 | Inagaki ..................................... 126/261 |
| 5,106,520 | 4/1992 | Salyer . |
| 5,137,011 | 8/1992 | Roth ................................... 126/263.01 |
| 5,211,949 | 5/1993 | Salyer . |
| 5,254,380 | 10/1993 | Salyer . |
| 5,282,994 | 2/1994 | Salyer . |
| 5,370,814 | 12/1994 | Salyer . |
| 5,423,996 | 6/1995 | Salyer . |
| 5,520,103 | 5/1996 | Zielinski ................................ 126/246 |
| 5,552,075 | 9/1996 | Salyer . |
| 5,565,132 | 10/1996 | Salyer . |
| 5,647,226 | 7/1997 | Scaringe et al. ........................ 62/457.2 |

*Primary Examiner*—James C. Yeung
*Attorney, Agent, or Firm*—Killworth, Gottman, Hagan & Schaeff LLP

[57] ABSTRACT

A thermal energy storage composition is provided which is in the form of a gel. The composition includes a phase change material and silica particles, where the phase change material may comprise a linear alkyl hydrocarbon, water/urea, or water. The thermal energy storage composition has a high thermal conductivity, high thermal energy storage, and may be used in a variety of applications such as in thermal shipping containers and gel packs.

14 Claims, 3 Drawing Sheets

ARTICLE FOR THERMAL ENERGY STORAGE

CROSS-REFERENCE TO RELATED APPLICATION

This application is a continuation of U.S. application Ser. No. 08/882,026, now abandoned filed Jun. 25, 1997 as a continuation application of Ser. No. 08/662,876, filed Jun. 12, 1996, now abandoned.

GOVERNMENT RIGHTS

The Government has rights in this invention pursuant to Contract No. 19X-SC542C awarded by the U.S. Department of Energy.

BACKGROUND OF THE INVENTION

The present invention relates to a composition for thermal energy storage, and more particularly, to a composition comprising a phase change material and silica particles, where the composition is in the form of a reversible gel which exhibits high thermal conductivity and high thermal storage capacity, and which becomes a hard solid at temperatures below the crystalline freezing temperature of the phase change component.

Phase change materials are known which may be repeatedly converted between solid and liquid phases and utilize their latent heats of fusion to absorb, store and release energy to heat or cool during such phase conversions. These latent heats of fusion are greater than the sensible heat capacities of the materials. For example, in phase change materials, the amount of energy absorbed upon melting or released upon freezing is much greater than the amount of energy absorbed or released upon increasing or decreasing the temperature of the material over an increment of 10° C.

Upon melting and freezing, per unit weight, a phase change material (PCM) absorbs or releases substantially more energy than a sensible heat storage material that is heated or cooled over generally the same temperature range. In contrast to a sensible heat storage material that absorbs and releases energy essentially uniformly over a broad temperature range, a phase change material absorbs and releases a large quantity of energy in the vicinity of its melting/freezing point.

Phase change materials capable of storing and releasing thermal energy have found many applications including beverage and food containers, medical wraps, and textile applications such as garments. However, one of the basic problems in the use of solid-to-liquid phase change materials for control of temperature is containment. That is, when the phase change material is in the liquid phase, it may leak out of any small holes in the vessel or pouch in which it is contained. Further, problems are encountered from expansion and contraction as the phase change material changes from a solid to liquid state, and from a liquid to solid state.

My U.S. Pat. No. 5,106,520 discloses a thermal energy storage material in the form of a dry powder formed from an alkyl hydrocarbon or water phase change material and silica particles. That composite eliminates this problem in that it does not liquify when the phase change material is heated above its melting point and will not form a rigid solid at temperatures below the melting point. Such a PCM/silica mix is useful as a hot or cold medical wrap.

However, the manufacture of such PCM/silica dry powders requires intensive mixing steps. Further, there are applications where it is desirable to obtain a higher rate of heat transfer than can be provided with the use of PCM/silica dry powders. For example, a higher rate of heat transfer would be beneficial in applications where it is desirable to maintain low temperatures, such as in shipping or refrigeration. In addition, because the PCM/silica dry powders do not form a rigid solid, it is difficult to determine when the composition has reached a frozen state.

Accordingly, there is still a need in the art for a thermal energy storage composition which has a high thermal storage capacity, which may be produced economically, and which may be used in a variety of applications. There is a further need in the art for a composition which will not leak out of the vessel in which it is contained, and which will form a rigid solid when cooled below the crystallization temperature, thereby providing a clear indication of conversion to the frozen state.

SUMMARY OF THE INVENTION

The present invention meets that need by providing a composition for thermal energy storage which is in the form of a reversible gel including a phase change material and silica particles. By reversible, it is meant that the composition may be repeatedly frozen and thawed. The composition in gel form provides a high rate of thermal conductivity and a high thermal storage capacity. The composition may be produced economically utilizing a simple mixing process. In addition, because the composition is in the form of a gel, the composition will not readily leak out of the vessel or pouch in which it is contained.

According to one aspect of the present invention, a composition for thermal energy storage is provided in the form of a gel and comprises from about 70% to 90% by weight of a phase change material and from about 10% to 30% by weight finely divided silica particles. The composition has a thermal energy storage of about 30–55 cal/gm.

In one embodiment of the invention, the phase change material is a linear alkyl hydrocarbon. In an alternative embodiment of the invention, the phase change material is a water/urea phase change material comprising about 75% by weight water and at least 25% by weight urea. In yet another embodiment of the invention, the phase change material is selected from the group consisting of water, a water/sodium chloride solution, and a water/calcium chloride solution.

Preferably, the composition contains from 15% to 25% by weight silica particles. The silica particles preferably have a density of about 2.0 and a particle size of about 0.005 to 0.025 microns. The silica particles may comprise hydrophylic or hydrophobic silica particles, depending on the desired application. For example, lower cost normal hydrophylic silicas may be used in all applications with water, but with alkyl hydrocarbon phase change materials only where resistance to water or high relative humidity is not required. The silica particles may also comprise precipitated or fumed silica particles.

The present invention also provides an article for use in thermal energy storage comprising a liquid impervious enclosure having disposed therein the reversible gel composition of the present invention comprising from about 70% to 90% by weight of a phase change material and from about 10% to 30% by weight finely divided silica particles. In one embodiment of the invention, the liquid impervious enclosure is a polymeric material and the article is useful as a cold solid or warm gel pack. The thermal energy storage composition may be used in a number of other applications such as medical therapy or in shipping containers. Possible specific applications include shipping containers for medicines, vaccines, antibiotics and organ transplants, where the temperature must be maintained in a specific narrow range.

Accordingly, it is an object of the present invention to provide a thermal energy storage material in the form of a reversible gel comprising a phase change material and silica particles. These, and other objects and advantages of the present invention, will become apparent from the following detailed description, the accompanying drawings, and the appended claims.

DETAILED DESCRIPTION OF THE PREFERRED EMBODIMENT

The gel composition of the present invention provides several advantages over prior art compositions which are in the form of dry powders. The composition provides a higher thermal conductivity and greater thermal storage per unit of volume than PCM/silica dry powders because the composition contains a lower amount of silica. The gel form of the composition actually represents an intermediate step in the process of forming a PCM/silica dry powder. Accordingly, the process for producing the composition in the form of a gel requires less process steps, and because less silica is required, the process is less expensive. The gel composition may be tailored to operate effectively over the temperature range of from below 0° C. to greater than 100° C., and thus may be used in a variety of applications.

Figure 1:
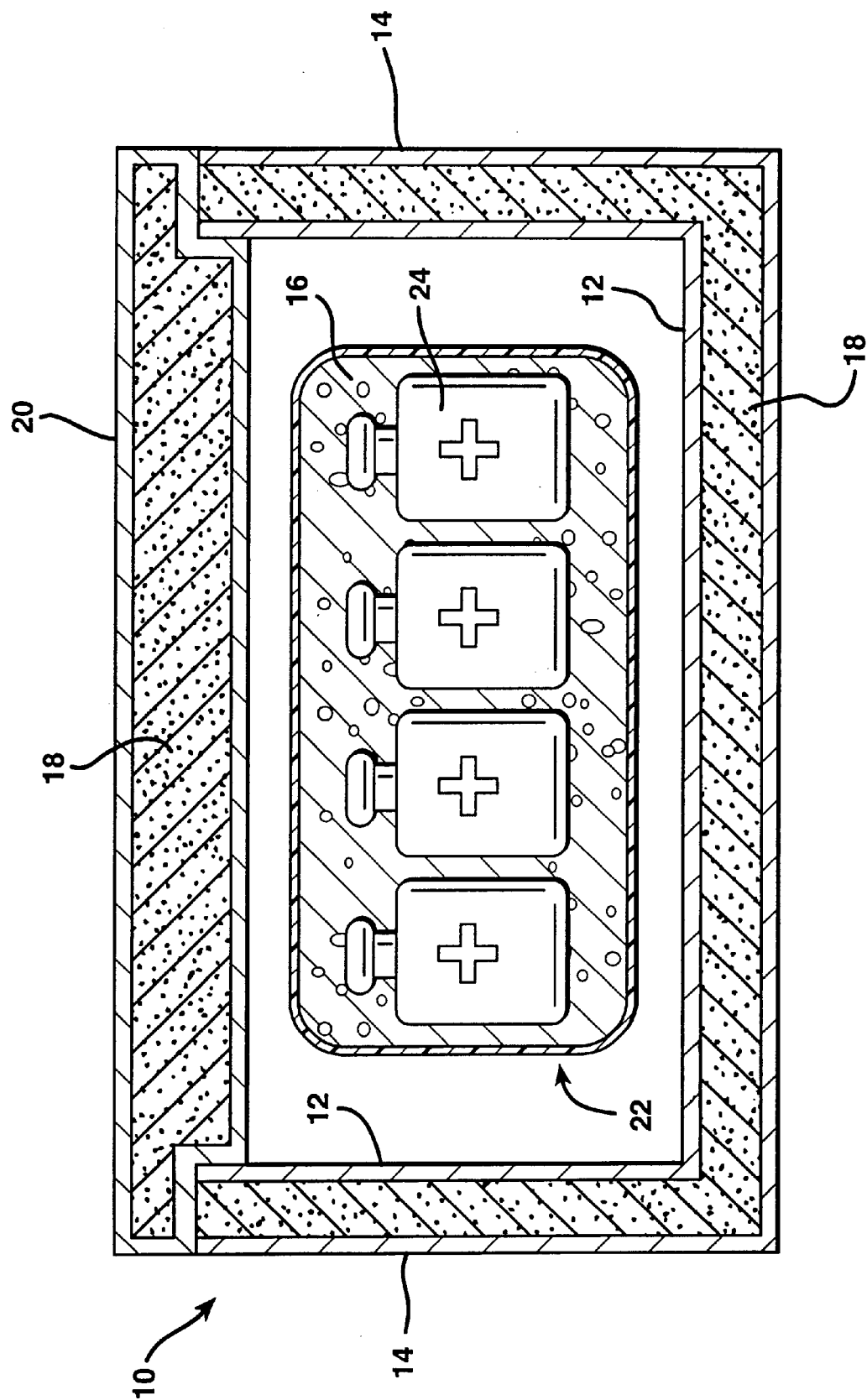
FIG. 1 is a sectional view of a shipping container utilizing the thermal energy storage composition of the present invention.

Referring now to the drawings, FIG. 1 illustrates a preferred embodiment of the invention in which a shipping container 10 is provided having outer walls 14, an inner wall 12 and a lid 20. The space between the liner and the walls may be filled with a low density foam or other insulating material 18, and the reversible gel 16 is placed in the container in the form of a gel pack 22, i.e., where the gel is separately encapsulated within a sealed polymeric or metal foil package or envelope, as described below with reference to FIG. 2. Such a container may be used to ship temperature sensitive materials such as food or medicines 24 as shown. The medicines 24 may be placed on the gel pack as shown, or if desired, the medicines may be placed inside a lined container and placed inside the gel pack. It is also possible for the gel to be placed inside a invection or blow-molded container which includes cavities for insertion of medicine bottles or food containers.

The use of the gel composition for these applications is advantageous in that it is easy to determine when the gel has reached a frozen state, which is important for shipping purposes. In addition, if the pack should become punctured during shipment, the gel will not leak outside of the container and may be recovered and repackaged.

Figure 1A:
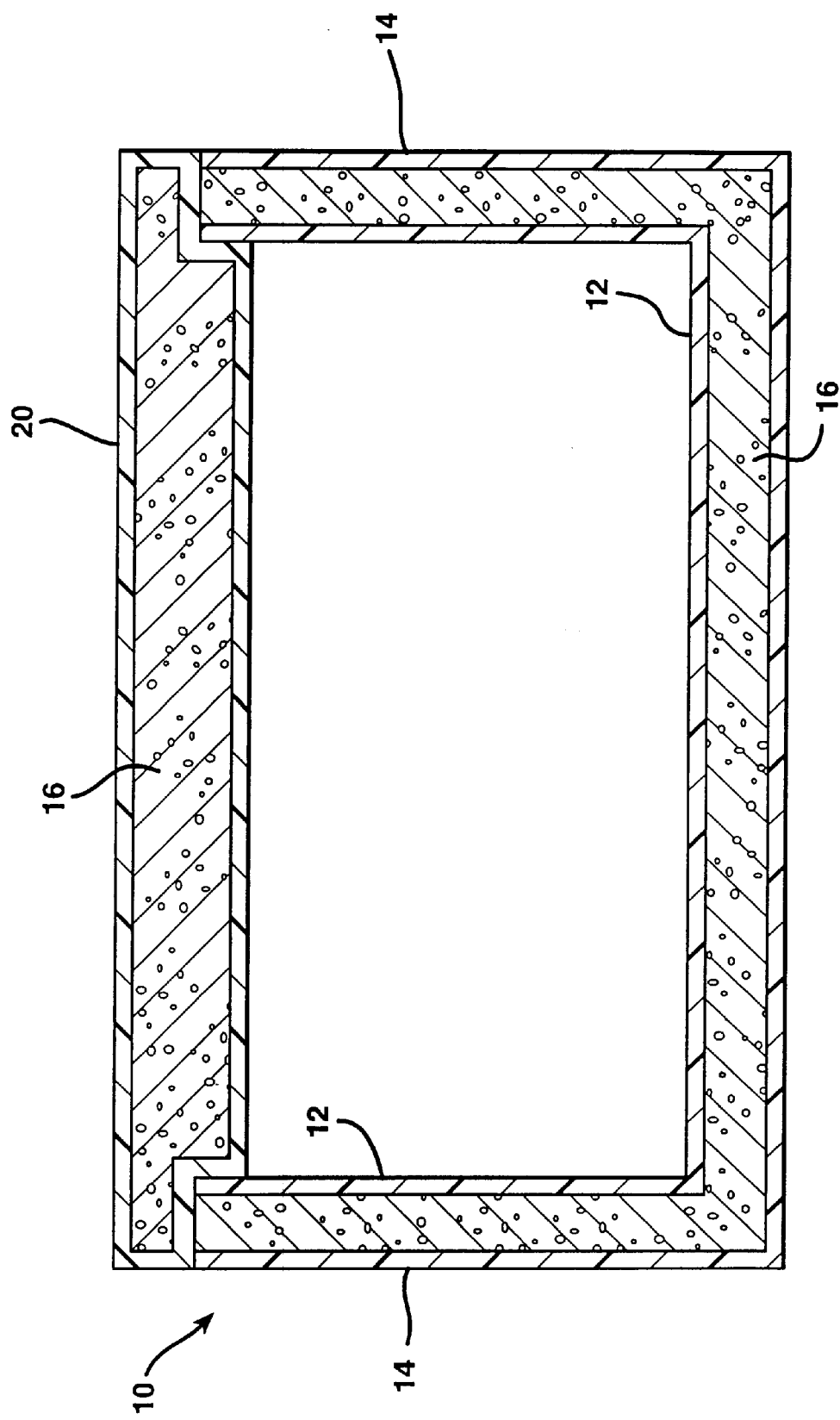
FIG. 1A is an alternative embodiment of the shipping container of FIG. 1.

FIG. 1A illustrates an alternative embodiment in which the shipping container 10 incorporates the gel composition 16 within the walls and/or lid of the container. Preferably, the container includes an outer wall 14 of plastic foam, wood, fiberboard or metal and an inner wall 12 of a polymeric liner material; although, other liner materials such as metal foil may also be used. The gel composition 16 is filled in the space between the liner and the walls of the container.

A phase change material which may be used in this embodiment of the invention is a linear alkyl hydrocarbon. A preferred linear alkyl hydrocarbon is an average C-15 (i.e., C-14–16) carbon alkyl hydrocarbon available from Exxon of Houston, Tex. under the designation Nor Par NP-15. The silica particles used with the linear alkyl hydrocarbon may be hydrophylic or hydrophobic. The silica particles may be rendered hydrophobic by treatment with about 15 pph of a silane coupling agent. The use of a hydrophobic silica is important in applications where the composition is exposed to liquid water or high relative humidity as it prevents phase separate of the PCM and silica. A preferred hydrophobic silica is available from PPG Industries of Pittsburgh, Pa. under the designation BXS-303. However, surface treated hydrophobic fumed silicas are also available from Cabot Corporation under the designations Cab-O-Sil® TS-610 and Cab-O-Sil® TS-720.

In applications where exposure to water is not a problem, lower cost normal hydrophylic silicas may be used. Suitable hydrophylic silicas include ABS precipitated silica from PPG Industries, and EH-5 fumed silica available from Cabot.

Figure 2:
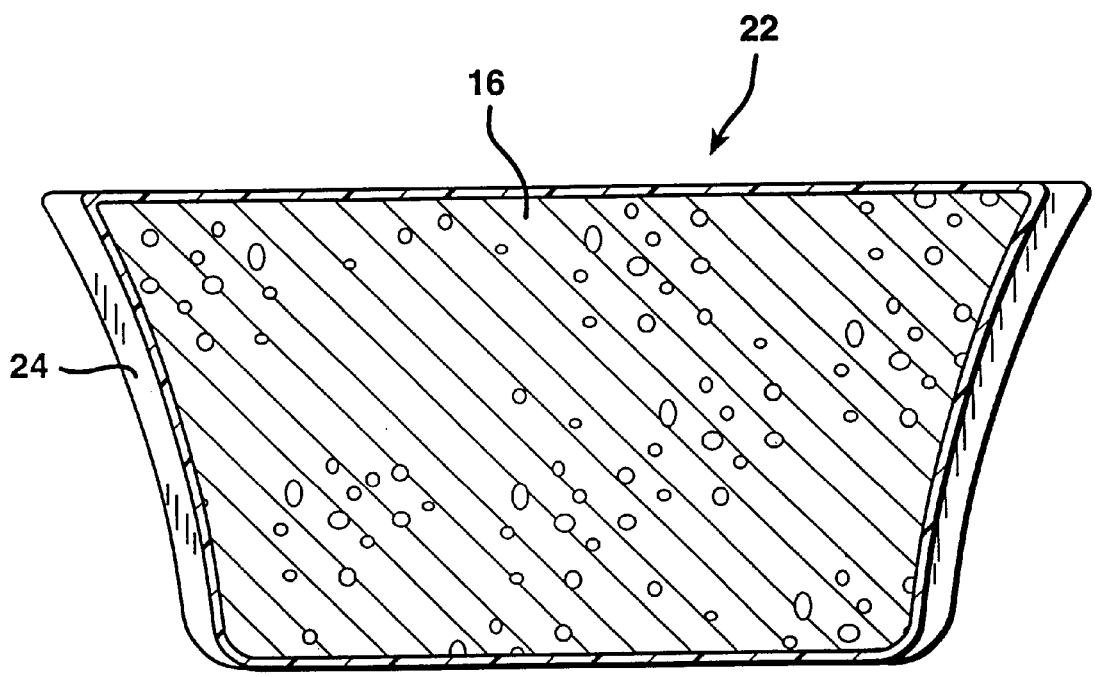
FIG. 2 is an elevational view of a reversible gel pack incorporating the thermal energy storage composition of the present invention.

FIG. 2 illustrates another embodiment of the invention in which the gel composition 16 is contained in a sealed envelope or package 24 so as to form a reversible gel pack 22. Preferably, the envelope or package is comprised of a flexible, liquid impervious polymeric material; although, a metal foil may also be used. The gel pack of this embodiment may be used for medical therapy, or for cold massage. Because the composition is in gel form, the gel will not readily leak out of the bag if there is a small hole in the container.

In another embodiment of the invention, the phase change material preferably comprises water/urea or water. The water/urea phase change material is a water/urea clathrate or inclusion compound which melts and freezes congruently in the range of about –11° C. to –15° C. The water/urea phase change material preferably comprises less than about 80% by weight water, and more preferably, within the range of about 78–70%, and at least 20% by weight urea, and more preferably within the range 22–30%. In the most preferred embodiment, the water/urea phase change material comprises about 75% by weight water and about 25% by weight urea. In embodiments where the phase change material comprises water/urea or water, a hydrophylic silica is required which may comprise precipitated or fumed silica particles.

The gel composition of the present invention is preferably formed by adding silica particles incrementally to the desired phase change material until a gel is formed. The PCM/silica mix may also include an antioxidant. Antioxidants, if used, should be added in an amount of from 0–1% by weight based on the weight of the PCM. A suitable antioxidant is Santowhite powder (i.e., 4,4'-isopropylidene bis(6-tert-butyl-m-cresol) available from Monsanto. A preferred food grade antioxidant is BHT (butylated hydroxy toluene) or BHA (butylated hydroxy anisole), available from Eastman Chemical Company under the designation TENOX.

In order that the invention may be more readily understood, reference is made to the following examples, which are intended to be illustrative of the invention, but are not intended to be limiting in scope.

EXAMPLE 1

A thermal energy storage composition was prepared in accordance with the present invention by placing 1000 g. of NP-15 (C-15 alkyl hydrocarbon from Exxon) onto a mixing tray and incrementally adding 1.0 g. of Santowhite powder antioxidant with stirring. 282 g. of ABS silica (PPG Industries) was then incrementally added to obtain a soft gel, where the resulting composition had a ratio of 78:22 PCM/silica.

A DSC (Differential Scanning Calorimetry) analysis of the gel was carried out over a temperature range of −25 to +25° C. at a heating and cooling rate of 2° C./minute. The results are shown below in Table 1.

TABLE 1

| Run No. | Tm (° C.) | Tc (° C.) | Tm-Tc (° C.) | Heat of Fusion (Cal/g.) | Heat of Recryst. (Cal/g.) |
|---|---|---|---|---|---|
| 1 | −25.67 | −28.80 | 3.13 | 2.97 | 3.13 |
|   | 8.80 | 4.71 | 4.09 | 28.03 | 29.15 |
| 2 | −25.25 | −28.82 | 3.57 | 3.24 | 3.17 |
|   | 8.83 | 4.76 | 4.07 | 28.82 | 28.67 |
| Avg. | −25.46 | −28.81 | 3.35 | 3.11 | 3.15 |
|   | 8.82 | 4.74 | 4.08 | 28.42 | 28.91 |

As can be seen, the melting temperature was about 8.82° C. and the freezing temperature was about 4.74° C. At a lower rate of heating and cooling (e.g., 0.2° C./minute), it is expected that the gel would melt and freeze congruently at about 6.78° C.

EXAMPLE 2

A thermal energy storage composition was prepared in accordance with the present invention by placing 1 liter of distilled water into a mixing tray. 310.55 g. ABS silica was added in small increments until a very stiff gel was formed. A DSC analysis was performed and the results are shown below in Table 2.

TABLE 2

| Run No. | Tm (° C.) | Tc (° C.) | Tm-Tc (° C.) | Heat of Fusion (Cal/g.) | Heat of Recryst. (Cal/g.) |
|---|---|---|---|---|---|
| 1 | 2.42 | −7.91 | 10.33 | 58.92 | 55.41 |
| 2 | 2.58 | −7.77 | 10.35 | 58.78 | 55.70 |
| Avg. | 2.50 | −7.84 | 10.34 | 58.85 | 55.56 |

EXAMPLE 3

A thermal energy storage composition was prepared by adding 429 g. of urea to 1000 g. of distilled water and mixing thoroughly. As soon as the urea was mixed, the temperature dropped, so the mixture was allowed to return to room temperature before proceeding. One liter of the water/urea solution was then weighed into a mixing tray. 318.02 g. ABS silica was then added in small increments until a very stiff gel was formed.

The thermal energy storage of the gel was determined by DSC analysis at a heating and cooling rate of 2° C./min. over the range of −50 to +25° C. The results are shown below in Table 3.

TABLE 3

| Run No. | Tm (° C.) | Tc (° C.) | Tm-Tc (° C.) | Heat of Fusion (Cal/g.) | Heat of Recryst. (Cal/g.) |
|---|---|---|---|---|---|
| 1 | −8.73 | −17.49 | 8.76 | 50.51 | 48.36 |
| 2 | −8.51 | −17.22 | 8.71 | 50.87 | 48.72 |
| Avg. | −8.62 | −17.36 | 8.74 | 50.69 | 48.54 |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An article for use in thermal energy storage comprising an enclosed shipping or storage container having disposed therein a reversible gel, said reversible gel having a high rate of thermal conductivity and a thermal energy storage of about 30 to 55 calories per gram, said reversible gel comprising from about 70% to 90% by weight of a phase change material and from about 10% to 30% by weight finely divided silica particles, whereby said reversible gel will form a rigid solid when cooled below the crystallization temperature, thereby providing a clear indication of conversion to the frozen state.

2. The article of claim 1 wherein said reversible gel is contained in a sealed polymeric or metal foil package or envelope so as to form a gel pack, which is placed in said shipping or storage container.

3. The article of claim 2 wherein said container has walls filled with an insulating material and said gel pack is placed inside said container.

4. The article of claim 1 wherein said container has walls and a liner with a space therebetween and said reversible gel is filled in the space between the liner and the walls of said container.

5. The article of claim 4 wherein said container is enclosed by a lid and a liner with a space therebetween and said reversible gel is filled in the space between the liner and the lid of said container.

6. The article of claim 1 wherein said reversible gel comprises from about 76.3 to 90% by weight of a water phase change material and from about 10 to 23.7% by weight finely divided hydrophilic silica particles.

7. The article of claim 6 in which said silica particles have a density of about 2.0.

8. The article of claim 6 in which said silica particles have particle sizes of about 0.005 to 0.025 microns.

9. The article of claim 6 in which said silica particles are precipitated silica particles.

10. The article of claim 6 in which said silica particles are fumed silica particles.

11. The article of claim 1 wherein said reversible gel comprises from about 81.8 to 90% by weight of a water/urea phase change material and from about 10 to 18.2% by weight finely divided hydrophilic silica particles.

12. The article of claim 11 wherein said water/urea phase change material comprises 70–78% by weight water and 22–30% by weight urea.

13. The article of claim 11 wherein said water/urea phase change material comprises about 75% by weight water and at least 25% by weight urea.

14. The article of claim 1 wherein said reversible gel comprises from about 78 to 90% by weight of a linear alkyl hydrocarbon phase change material and from about 10 to 22% by weight finely divided silica particles.

* * * * *